R. PEDLOW.
SWING HANGER.
APPLICATION FILED AUG. 14, 1915.
1,177,573.
Patented Mar. 28, 1916.
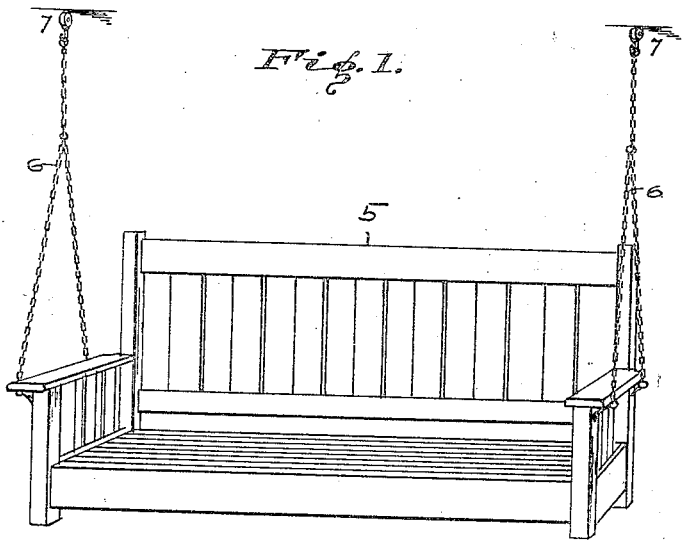
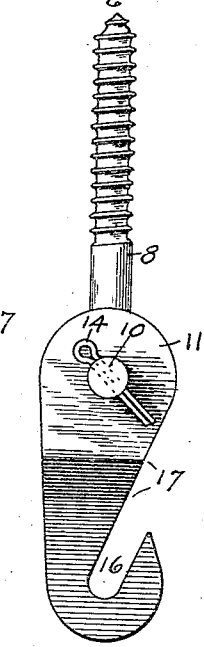
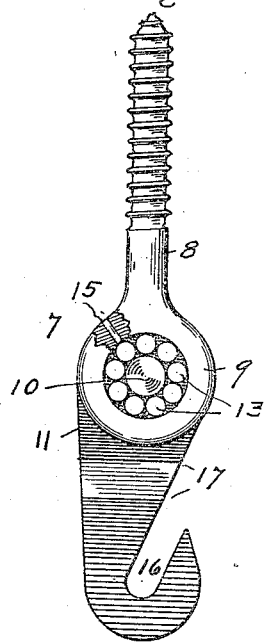
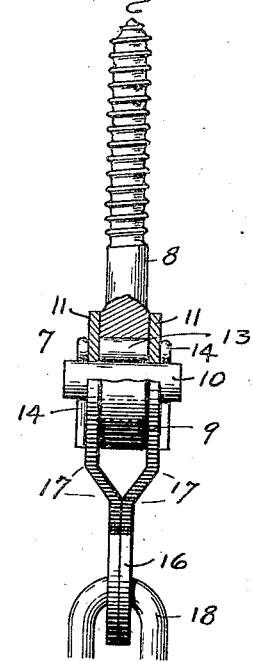
WITNESSES:
Henry G. Petersen
Wm Hurte
INVENTOR:
Richard Pedlow,
By Minturn & Werner,
Attorneys.

UNITED STATES PATENT OFFICE.

RICHARD PEDLOW, OF INDIANAPOLIS, INDIANA, ASSIGNOR OF ONE-HALF TO THEODORE C. SCHULLER, OF INDIANAPOLIS, INDIANA.

SWING-HANGER.

1,177,573.  Specification of Letters Patent.  Patented Mar. 28, 1916.

Application filed August 14, 1915. Serial No. 45,451.

*To all whom it may concern:*

Be it known that I, RICHARD PEDLOW, a citizen of the United States, residing at Indianapolis, in the county of Marion and State of Indiana, have invented certain new and useful Improvements in Swing-Hangers, of which the following is a specification.

This invention relates to improvements in hangers for the suspension of swings, and the object of the invention is to provide roller bearings to reduce the friction and obviate the creaking noise which usually attends the use of porch and other swings as ordinarily suspended.

A further object is to provide an inexpensive hanger which lends itself to the quick and easy assembly of the bearing rollers, and to provide such a hanger which will also be strong and durable.

I accomplish the above objects by the mechanism illustrated in the accompanying drawings, in which—

Figure 1 is a perspective view of a porch-swing suspended from hangers of my invention. Fig. 2 is a side elevation of my improved hanger. Fig. 3 is a similar view with the hook plate and its retaining key removed to show the rollers, the eye of the screw being partly in section, and Fig. 4 is a front edge elevation of the hanger, partly in vertical section.

Like characters of reference indicate like parts throughout the several views.

The drawing illustrates a porch swing 5 of familiar form but it is not desired to limit the invention to that or any particular kind of a swing. It is suspended by the aid of chains 6, 6, from hangers 7, 7, fastened to a ceiling, beam, or other overhead support.

The hanger comprises a bolt 8, here shown as having a coarse thread such as is provided for screws to enter wood, but which may be formed with a finer thread to receive a nut in the usual way where a support suitable for a wood-screw is not available. The opposite end of the bolt is expanded into a head 9 with a cylindrical bore or eye for the passage of a shaft 10, for the attachment of a pair of plates 11, 11, one on each side of the head. The bore is sufficiently greater than the diameter of the shaft 10 to receive bearing rollers 13, a row of which is inserted around the shaft in the manner as is clearly shown in Fig. 3 with their ends against the plates 11, 11. The plates are here shown as retained by pins 14, 14, which are passed through the projecting ends of the shaft, and which will afford access to the rollers for any purpose by withdrawing one of the pins and lifting off one of the plates in the manner shown in Fig. 3, but for cheap construction the fastening may be accomplished by riveting or expanding the ends of the shaft after the placing of the plates. An oil-hole 15 is for the introduction of a lubricant to the shaft and rollers.

The lower ends of the plates are extended to form hooks 16, and the hooked portions are brought into contact with each other in a line with the axis of the bolt 8 by bends 17. A link 18 of the chain will engage both hooks in the manner shown in Fig. 4 which will cause the weight suspended by the chain to so force the hook-extensions of the plates together as to prevent their spreading and insure proper retention of the rollers although the plates are only otherwise held by the shaft 10.

Having thus fully described my invention what I claim as new and wish to secure by Letters Patent of the United States, is—

1. In a hanger for swings and the like, the combination with a bolt having means for attachment to a support and also having a head with an eye, of a pair of plates between which the head is assembled, said plates having a depending hook in two vertically separable parts separable in a plane of contact between the plates, a shaft passing through the eye in the bolt and through both plates, and rolling friction-reducing members assembled in the eye around the shaft.

2. In a hanger for swings and the like, the combination with a bolt having means for attachment to a support and also having a head with an eye, of a pair of separate plates between which the head is assembled, each plate having a shaft opening and a lower extension terminating in a hook, said plate extensions being bent under the bolt head to contact the extensions with each other in a plane in the axis of the bolt, a shaft passing through the eye in the bolt and through the shaft-opening in each plate, roller bearings around the shaft in said eye, and means to prevent the removal of the plates from the shaft.

In witness whereof I have hereunto set my hand and seal at Indianapolis, Indiana, this 2nd day of August, A. D. one thousand nine hundred and fifteen.

RICHARD PEDLOW. [L. S.]

Witnesses:
   THEODORE SCHULLER,
   HENRY G. PETERSEN.